United States Patent
El Gamal et al.

(10) Patent No.: US 7,492,400 B2
(45) Date of Patent: Feb. 17, 2009

(54) ADAPTIVE PIXEL FOR HIGH DYNAMIC RANGE AND DISTURBANCE DETECTION AND CORRECTION

(75) Inventors: Abbas El Gamal, Palo Alto, CA (US); Sam Kavusi, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 987 days.

(21) Appl. No.: 10/858,944

(22) Filed: Jun. 1, 2004

(65) Prior Publication Data

US 2008/0316347 A1    Dec. 25, 2008

(51) Int. Cl.
*H04N 3/14* (2006.01)
*H04N 5/335* (2006.01)

(52) U.S. Cl. ............... 348/296; 250/208.1; 348/222.1; 348/294; 348/297

(58) Field of Classification Search ............ 250/208.1; 348/294, 297, 308; 382/165
See application file for complete search history.

(56) References Cited

U.S. PATENT DOCUMENTS

| | | | | |
|---|---|---|---|---|
| 6,919,549 B2* | 7/2005 | Bamji et al. | ............ | 250/208.1 |
| 6,927,796 B2* | 8/2005 | Liu et al. | ................ | 348/297 |
| 6,963,370 B2* | 11/2005 | DiCarlo et al. | ............ | 348/297 |
| 7,106,373 B1* | 9/2006 | Dierickx | ................ | 348/308 |
| 2004/0174754 A1* | 9/2004 | Lee et al. | ................ | 365/200 |
| 2007/0158533 A1* | 7/2007 | Bamji et al. | ............ | 250/208.1 |

OTHER PUBLICATIONS

Rhee, Jehyuk et al. Wide Dynamic Range CMOS Image Sensor with Pixel Level ADC. Feb. 20, 2003. vol. 39 No. 4. Electronic Letters, pp. 360-361.
Acosta-Serafini, Pablo M. et al. A ⅓" Linear Wide Dynamic Range CMOS Image Sensor Implementing a Predictive Mulpile Sampling Algorithm with Overlapping Integration Intervals. Sep. 9, 2004. vol. 39 No. 9. IEEE Journal of Solid State Circuits, pp. 1487-1496.
Stuart Kleinfelder et al., "A 10,000 Frames/s CMOS Digital Pixel Sensor," IEEE Journal of Solid-State Circuits, vol. 36, No. 12 Dec. 2001.

(Continued)

*Primary Examiner*—Ngoc-Yen T Vu
*Assistant Examiner*—Chia-Wei A Chen
(74) *Attorney, Agent, or Firm*—Lumen Patent Firm

(57) ABSTRACT

A new adaptive pixel architecture, folded-multiple-capture (FMC), integrates synchronous self-reset and multiple capture schemes and advantageously eliminates the requirement of a high-frame-rate sensor array, which is essential for conventional image sensors with high dynamic range. The FMC comprises a per-pixel analog-front-end (AFE), a fine analog-digital convertor (ADC) stage, and a digital-signal-processor/controller (DSPC) stage. The AFE performs programmable gain control, synchronous self-reset, sample-and-hold, and enables disturbance detection. In the AFE, a comparator compares an integrator output with a threshold voltage and produces a binary sequence accordingly. The ADC utilizes the binary sequence and the folded multiple capture signals to estimate photocurrent. An image sensor embodying the present invention adapts integration time to signal level, has minimal per-pixel hardware requirement, provides a very high dynamic range, about 120 dB or more, at high speed, about 1,000 frames/s or more, detects and corrects subframe disturbances, and consumes significantly less power.

14 Claims, 7 Drawing Sheets

OTHER PUBLICATIONS

S. Kleinfelder et al., "A 10,000 Frames/s 0.18 um CMOS Digital Pixel Sensor with Pixel-Level Memory," In Proceedings of the 2001 IEEE International Solid-State Circuits Conference, PP/ 88-89, San Francisco, CA Feb. 2001.

B. Wandell et al., "Multiple Capture Single Image Architecture with a COMS Sensor," In Proceedings of the International Symposium on Multispectral Imaging and Color Reproduction for Digital Archives, pp. 11-17, Chiba, Japan, Oct. 21-22, 1999.

A. El Gamal, "Trends in CMOS Image Sensor Technology and Design," in a, IEDM 2002, Dec. 2002.

Jagdish Sabde et al., "Focal Plane Array Sensor Readout Correction On a Reconfigurable Processor," 11th NASA VLSI Design Symposium, Coeur D'Alene, Idaho, May 29-29, 2003.

Raymond Balcerak et al., "Technology for Infrared Sensors Produced in Low Volume," retrieved on Apr. 15, 2004. Retrieved from the internet: <URL: http://www.darpa.mil/MTO/sensors/irfpa/articles/photonics/index.html>.

Boyd Fowler et al., Low FPN High Gain Capacitive Transimpedance Amplifier for Low Noise CMOS Image Sensors, retrieved on May 28, 2004. Retrieved from the internet: < URL: http://www.qss.stanford.edu/~godfrey/imaging/lfpn_ctia_spie_01.pdf-193k>.

Stuart Kleinfelder et al., "Multi-Million Frames/s Sensor Circuits for Pulsed-Source Imaging," retrieved on May 28, 2004. Retrieved from the internet: <URL: http://www.ece.uci.edu/~stuartk/NSS-MEGA-FINAL.pdf-446k>.

S. Kavusi et al., "Quantitative Study of High Dynamic Range Image Sensor Architectures," In Sensors, Cameras, and Systems for Scientific/Industrial Applications, M. M. Blouke, G. M. W. JR., and R, J. Motta, EDS., Proc. SPIE 5301, Jan. 2004.

S. Kavusi et al., "Quantitative Study of High Dynamic Range Sigma-Delta-based Focal Plane Array Architectures," SPIE Defense and Security Symposium, Apr. 2004

* cited by examiner (a)

(b)

(c)

ADAPTIVE PIXEL FOR HIGH DYNAMIC RANGE AND DISTURBANCE DETECTION AND CORRECTION

STATEMENT REGARDING FEDERALLY SPONSORED RESEARCH OR DEVELOPMENT

This invention was supported in part by the Defense Advanced Research Projects Agency (DARPA) of the Department of Defense (DoD) under Microsystems Technology Office Award Number N66001-02-1-8940. The U.S. Government has certain rights in the invention.

FIELD OF THE INVENTION

The invention generally relates to pixel sensors, and more particularly relates to a new adaptive pixel design and architecture enabling high dynamic range disturbance-tolerant image sensors with minimal per-pixel hardware, robust to device variations.

BACKGROUND OF THE INVENTION

Cameras, visible and infrared, are currently being utilized in a wide variety of applications. For example, surveillance/security cameras are commonly used to observe and track people and their activities in certain areas/locations. In automotive applications, cameras have been integrated into modern cars and trucks to help drivers and, in some cases, to monitor passengers in case of an accident. In military applications, a Forward Looking Infrared (FLIR) camera is used to observe a scene or to track a target. Other applications include industrial/structural inspection, nondestructive-testing, thermo-graphic inspection, thermal infrared imaging, night vision, remote temperature measurement, aerospace imaging, multispectral imaging, unmanned vehicle payloads, spectroscopy, firefighting, transportation, etc.

The heart of the camera is an electronic circuit (i.e., a sensor array) that captures images and provides corresponding digital values for each pixel. The performance of the sensor array is essential to the performance of the camera as a system or device. FIG. 1 is a simplified diagram of a conventional pixel sensor 100. A photoconductive diode (photo detector) produces a photo-induced current ($I_{ph}$) 102, also known as "photocurrent", that is proportional to the amount of light 101 incident on the diode. When no light is incident on the diode, some leakage current ($I_{dc}$) 103, also referred to as dark current, will flow through the diode. Total current ($I_{total}$) 104 equals photo-induced current ($I_{ph}$) 102 plus dark current ($I_{dc}$) 103 per Kirchoff's current law. A current to voltage convertor/amplifier 105 converts the total current ($I_{total}$) 104 to an analog voltage ($V_{total}$) 106. An analog-to-digital convertor (ADC) 107 then converts this analog voltage ($V_{total}$) 106 and correspondingly produces a digital signal, i.e., pixel value ($P_{value}$) 108.

Most imagers operate in a direct-integration mode where photocurrent is integrated over a capacitor. In its simplest and most area efficient form, integration is performed onto the photodiode parasitic capacitance. Many sensor arrays, including most of the infrared ones, use an external capacitor as the integrator. The accumulated charge is read out at the end of integration time. High integration time is desirable because it increases the accuracy of the estimated photocurrent. However, integration time cannot be made arbitrarily long due to integrator saturation and scene motion considerations. Frame rate also limits integration time.

The integrator outputs electrical signals representing the intensity of the image captured by the sensor array, i.e., the imager or the image sensor. It is important that the image sensor be usable under a variety of lighting conditions because the wider the variety of lighting conditions under which the image sensor is usable the better the image quality. Consequently, the quality of an imaging system is mainly measured by the image sensor's dynamic range and its ability to mask noises, i.e., its signal-to-noise ratio (SNR), under low light conditions.

Generally, signal-to-Noise Ratio (SNR) is the ratio of the signal power over the noise power. Dynamic range is the ratio of the maximum non-saturating signal to the minimum detectable signal (i.e., signal with SNR=1). The dynamic range of an image sensor measures how wide a range of lighting the sensor can accurately capture. For example, a scene including both a tree lit by bright sunlight and a person standing under the tree has a high dynamic range. This high dynamic range makes it difficult for the image sensor, such as one used in a camera, a video recorder, or a security monitor, to capture details of both the brightly lit tree and the person standing in the tree's shadow. Although in most of the applications a sufficiently high dynamic range is required, dynamic range of conventional sensor arrays (e.g., charge-coupled devices, or CCDs) is usually limited.

Several schemes have been proposed to increase the dynamic range of the sensor array, see, for example, 1. S. J. Decker et al. "A 256×256 CMOS Imaging Array with Wide Dynamic Range Pixels and Column-Parallel Digital Output" IEEE J. of Solid-State Circuits, December 1998, V. 33, pp. 2081-2091.
2. T. Lule et al. "Design and Fabrication of a High Dynamic Range Image Sensor in TFA Technology" IEEE J. of Solid-State Circuits, May 1999, V. 34, pp. 704-711.
3. W. Yang "A Wide-Dynamic Range, Low-Power Photosensor Array" IEEE Int. Solid-State Circuits Conf., San Francisco, Calif., February 1994, pp. 230-231.
4. L. G. McIlrath "A Low-Power Low-Noise Ultrawide-Dynamic-Range CMOS Imager with Pixel-Parallel A/D Conversion" IEEE J. of Solid-State Circuits, May 2001, V. 36, I. 5, pp. 846-853.
5. B. Fowler et al. "A CMOS Area Image Sensor with Pixel-Level A/D Conversion" IEEE Int. Solid-State Circuits Conf., San Francisco, Calif., February 1994, TP 13.5, pp. 226-227.
6. D. Yang et al. "A 640×512 CMOS Image Sensor with Ultrawide Dynamic Range Floating-Point Pixel-Level ADC" *JSSCC*, December 1999, V. 34, No. 12, pp. 1821-1834.
7. S. Kleinfelder et al. "A 10,000 Frames/s CMOS Digital Pixel Sensor" IEEE J. of Solid-State Circuits, December 2001, V. 36, No. 12, pp. 2049-2059.

All of these schemes would perform better if the required frame rate were low. The user or tracking/rendering program that uses the raw frames usually dictates the frame rate. Essentially, the incident photon flux constancy over the pixel limits the frame rate. Motion forces the required frame rate; however, a mechanical image stabilizer usually compensates fast vibrations, thereby relaxing the frame rate requirement, which, in most applications, is low (e.g., 30 Hz).

One major problem for cameras is the presence of disturbance. Disturbance is any anomaly in the constant incident photon flux on the pixel. For example, a fast temporary reflection of the sun can cause a temporary spike in the photon flux. This is a usual scenario in automotive applications. In tactical applications, laser jamming is a technique use to ruin the frames taken by the camera. For example, a one-watt carbondioxide laser at 10 µm creates five orders of magnitude higher photocurrent in a long-wave infrared detector than the sun. The random movement of such a laser by the target creates saturation or partial loss of information in the sensor array when it reaches the camera. A similar scenario is possible in security applications. Such events cause spikes in the incident photon flux, resulting in undesirable partial or complete loss of information.

The state-of-the-art mechanism to overcome this problem is to use a fast frame rate, high dynamic range sensor array with over-sampled frames to detect and correct such disturbances in digital domain. This technique requires a high-speed sensor array, which has a high sensitivity and high dynamic range. However, there are fundamental limitations in achieving such performance.

For example, in order to be able to detect a temperature difference of 1 mK, the maximum possible frame rate is only 25 frames per a second (=1/0.04) for a nominal long-wave infrared pixel. This low frame rate is enough for most applications; however, the disturbance frequency would require a sensor array with a substantially much higher frame rate, e.g., 10,000 frames/s.

Moreover, certain applications require averaging techniques in digital domain on over-sampled frames. This requires very high resolution in the analog-digital convertor (ADC) stage, which is extremely challenging. It is only achievable with very high power consumption.

Clearly, there is a continuing need in the art for a new pixel sensor design and architecture that offers pixel-level disturbance detection and correction without requiring the overall sensor array to have a high frame rate and that offers very high dynamic range at high speed with much lower power, bandwidth, and memory requirements.

SUMMARY OF THE INVENTION

The present invention provides a new adaptive pixel sensor design and architecture that address the aforementioned need in the art. The architecture, which is also denoted as "folded-multiple capture" or "FMC", advantageously combines synchronous self-reset for signal folding and disturbance detection with multiple capture for achieving high SNR at both the high and low ends of the dynamic range.

An important aspect of the invention is realizing that self-reset can be used for folding the signal. Based on this principle, it is possible to find capture times that give high fidelity even with synchronous self-reset. Similarly, we can find global capture times to minimize the average distortion over the entire image.

The FMC comprises a per-pixel analog-front-end (AFE), a fine ADC stage, and a digital-signal-processor/controller (DSPC) stage. The AFE, which takes form of a modulator, performs programmable gain control, synchronous self-reset, sample-and-hold, as well as enables disturbance detection at pixel level.

The modulator has an integrator and a comparator. The integrator output is compared to a threshold value to detect saturation or to indicate reaching a certain threshold. The comparator can be synchronized or asynchronized. To recover the reset times, it is sufficient to store the binary sequence in which a "1" refers to reset/charge-subtraction and a "0" refers to no reset/charge-subtraction. This reset sequence is stored in a memory buffer. It can be stored in a compressed or non-compressed form.

The fine or high resolution ADC quantizes the integrator output at the end of the frame time. The integration time for each sample is derived from the binary reset sequence. The ADC can be shared among several pixels. In some embodiments, the comparator can also function as the ADC. The DSPC or DSP performs the detection/correction of SNR spikes using the binary sequence and estimates the photon flux using the binary sequence (via memory buffer) and the folded multiple capture signals (via ADC output). There is redundancy in the binary sequence and the ADC quantized values, i.e., they both can be used to estimate the photocurrent and to correct for errors and disturbances.

An important advantage of the present invention is that a high-frame-rate sensor array is not required. That is, the FMC architecture advantageously eliminates the requirement of high frame rate sensor array for high dynamic range image sensors. Frame rate is set by the scene motion, e.g., 30 frames/second, and the coarse comparator running in fast speed provides disturbance detection, where applicable. That is, the internal clock of the sensor array is high, e.g., 1 MHz, which enables the detection of disturbances. The output frame rate can be easily adapted via the DSPC. Note that because of the fast internal clock, there is a very small delay in detecting the presence of disturbance or change in the imaging condition. This is beneficial especially if the DSPC wants to control the shutter/aperture; for example, in case of an extremely high photon flux (e.g., high power laser), the camera shutter should be closed to avoid sensor burn out.

Because the FMC architecture enables the pixel sensor to adapt the integration time to signal level, it provides a very good performance (sensitivity) and very high dynamic range with much lower power, bandwidth, and memory requirements. Another significant benefit of the invention is that the AFE has relaxed circuitry specifications. For example, the comparator can be a simple latch. The minimal per-pixel hardware requirement makes the present invention particularly feasible and highly desirable in current camera systems and related technologies. What is more, the ADC is optimized for significantly lower power consumption as compared to the known extended counting scheme.

Still further objects and advantages of the present invention will become apparent to one of ordinary skill in the art upon reading and understanding the detailed description of the preferred embodiments and the drawings illustrating the preferred embodiments disclosed herein.

DESCRIPTION OF THE PREFERRED EMBODIMENT(S)

Figure 1:
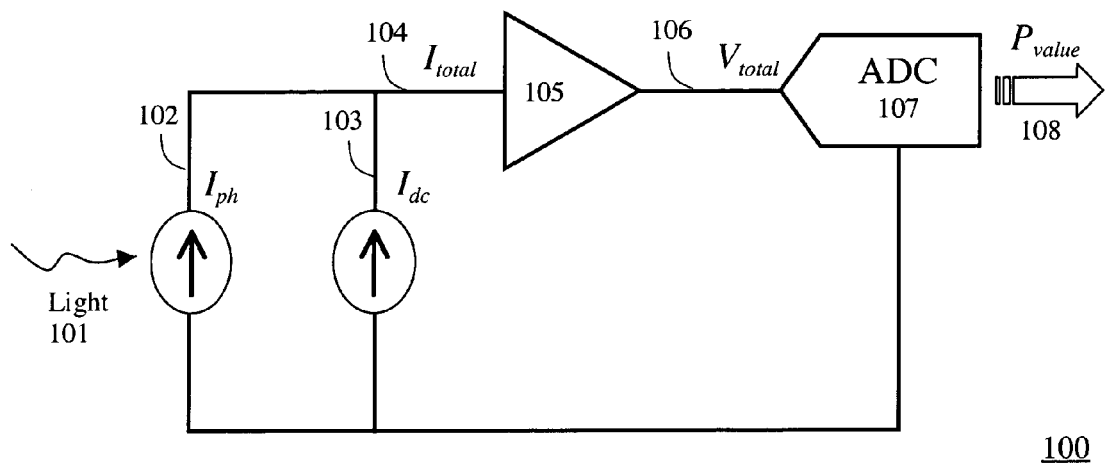
FIG. 1 illustrates a convention pixel sensor.

CMOS (complimentary metal oxide semiconductor) technology scaling has enabled the integration of analog and digital processing down to the pixel-level, substantially enhancing CMOS image sensor performance. An example is the Digital Pixel Sensor, where digitization is performed at the pixel-level, providing ultra high speed and dynamic range imaging capabilities, see, S. Kleinfelder, S. Lim, X. Liu, and A. El Gamal, "A 10,000 Frames/s CMOS Digital Pixel Sensor," IEEE J. of Solid-State Circuits, December 2001, 36(12), pp. 2049-2059.

As exemplified in the following articles, vertical integration provides the promise for even higher levels of pixel-level integration. See, S. Benthien, T. Lul'e, B. Schneider, M. Wagner, M. Verhoeven, and M. Bohm, "Vertically Integrated Sensors for Advanced Imaging Applications," IEEE J. of Solid-State Circuits, July 2000, 35(7), pp. 939-945. See, also, J. Burns, L. McIlrath, C. Keast, C. Lewis, A. Loomis, K. Warner, and P. Wyatt, "Three-Dimensional Integrated Circuits for Low-Power High-Bandwidth Systems on a Chip," IEEE International Solid-State Circuits Conference, February 2001, pp. 268-269.

As one skilled in the art will appreciate, vertically integrated sensor arrays (VISA) are of particular importance to tactical infrared (IR) imaging applications. A useful IR imaging system would need to adapt to different environments with widely varying temperature ranges and object speeds. It also needs to be able to tolerate undesirable imaging conditions, for instance, due to laser jamming or sun reflection. Such disturbances cause spikes in the photocurrent resulting in partial or complete loss of information. The wide range of inter-scene temperature and the presence of disturbances thus require VISA to have a very high dynamic range of 120 dB or more at 1000 frames/sec or more, see, S. B. Horn, P. R. Norton, J. D. Murphy, and R. E. Clement, "Vertically Integrated Sensor Arrays (VISA)," SPIE Defense and Security Symposium (Invited Paper), April 2004. Unfortunately, today's IR imaging systems are not able to meet all of the VISA requirements with acceptable SNR fidelity.

To address the high dynamic range problem of conventional focal plane arrays, different sensor readout architectures, including multiple capture, synchronous self-reset, and extended counting, have been proposed, see, e.g., C. Jansson, "A High-Resolution, Compact, and Low-Power ADC Suitable for Array Implementation in Standard CMOS," IEEE Transactions on Circuits and Systems, November 1995, 142 (11), pp. 904-912. We compared several of these schemes based on their SNR, implementation complexity, and power consumption in the following articles, which are incorporated herein by reference.

1. D. Yang and A. El Gamal, "Comparative Analysis of SNR for Image Sensors with Enhanced Dynamic Range," in Sensors, Cameras, and Systems for Scientific/Industrial Applications, M. M. Blouke and G. M. W. Jr., eds., Proc. SPIE 3649, pp. 197-211, April 1999.
2. S. Kavusi and A. El Gamal, "Quantitative Study of High Dynamic Range Image Sensor Architectures," in Sensors, Cameras, and Systems for Scientific/Industrial Applications, M. M. Blouke, G. M. W. Jr., and R. J. Motta, eds., Proc. SPIE 5301, January 2004.
3. S. Kavusi and A. El Gamal, "Quantitative Study of High Dynamic Range Sigma-Delta-based Focal Plane Array Architectures," SPIE Defense and Security Symposium, April 2004.

In general, in the multiple capture scheme the integrated photocurrent is sampled nondestructively multiple times during the integration time and the slope of the ramp is estimated by dividing the last sample before saturation by its corresponding capture time. In the case of a low photocurrent, the multiple capture scheme works similar to a conventional sensor.

The synchronous self-reset with residue readout scheme tries to count the number of times the well capacity is reset and then add up the charge. To avoid the rough estimation at the low end, the residue of the integrator is also readout at the end of the frame and then added up. Again, at the low end of the dynamic range, it works similar to a convention sensor.

In these studies, we found that the multiple capture scheme achieves high SNR over the extended range (i.e., has high fidelity), but cannot achieve high dynamic range (120 dB or more) at 1000 frames/sec, due to the speed/resolution tradeoff. As one skilled in the art will recognize, these are exemplary numbers and can vary depending on need and/or desire.

On the other hand, the synchronous self-reset scheme can achieve very high dynamic range at a high frame rate with relatively low power, but suffers from poor SNR at both the low and extended ends. We also analyzed the extended counting scheme and found that it can achieve high dynamic range at high frame rate with good SNR at the extended end, but at the expense of high power consumption.

Figure 2:
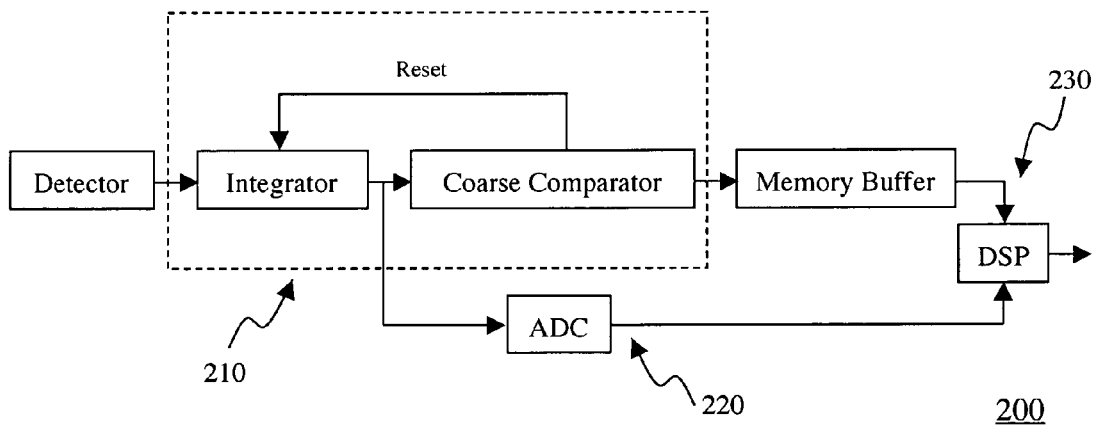
FIG. 2 is a top-level design diagram of the present invention.

FIG. 2 is a top-level design diagram showing an adaptive pixel architecture 200, which we denote as folded-multiple-capture (FMC). The architecture combines synchronous self-reset for signal folding and multiple capture for disturbance detection, achieving high SNR at both the high and low ends of the dynamic range while advantageously eliminating the requirement of a high-frame-rate sensor array and consuming significantly less power than conventional image sensors.

The FMC architecture 200 comprises a per-pixel analog-front-end (AFE) 210, a fine ADC stage 220, and a digital-signal-processor/controller (DSPC) stage 230. The AFE, which is the key part of the architecture, performs programmable gain control, synchronous self-reset, sample-and-hold, as well as enables disturbance detection. It can be implemented with relaxed circuit requirements and is robust to device variations. The ADC is shared by several neighboring pixels and is optimized for low power consumption. The DSPC is also shared among several pixels. It estimates each pixel's signal from the ADC and AFE outputs and controls the AFE and ADC to adapt the operation to the imaging conditions. The FMC architecture can be readily implemented using vertical integration and is compatible with its area, interconnection and power constraints.

In the following sections, we describe the FMC architecture, analyze its dynamic range and SNR, and discuss how it can be used to combat disturbances. We further demonstrate that FMC can achieve comparable, if not better, SNR at the same dynamic range as extended counting with significantly lower power consumption and more robust AFE implementation. Readers are directed to the above referenced articles for relevant background, terminology, and notations, which, for the sake of brevity, are not repeated here.

1. The FMC Architecture

Figure 3:
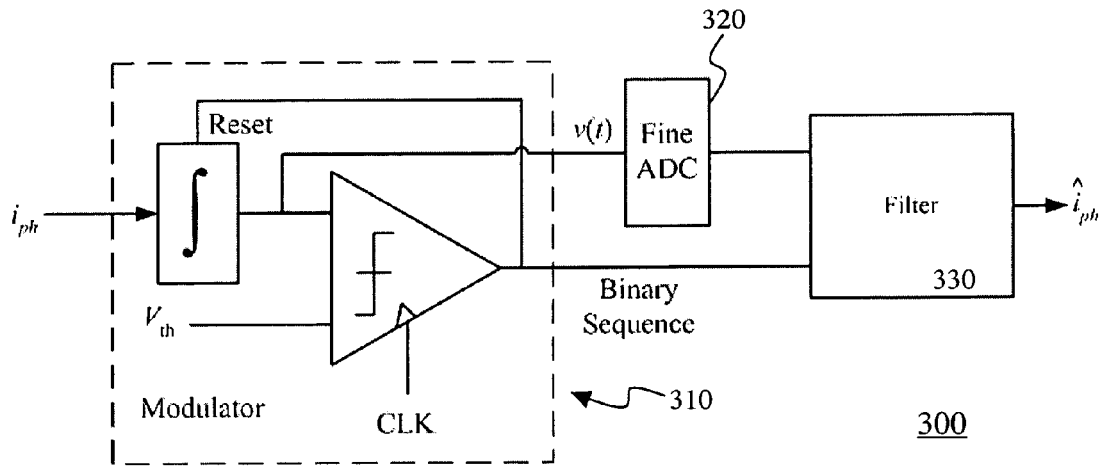
FIG. 3 schematically illustrates the adaptive pixel architecture with per-pixel modulator.

FIG. 3 is a block diagram of the FMC scheme 300. The scheme employs a synchronous self-reset modulator 310 but employs a capture and filtering scheme different from the synchronous self-reset with residue readout scheme. The integrator output is periodically compared, at the rising edge of the clock signal CLK, to a threshold voltage $V_{th}$. When $v(t)>V_{th}$, the comparator flips and resets the integrator. During this operation, the integrator value is captured and digitized by the fine ADC 320 at times $t_1, t_2, \ldots, t_n$, where $t_i \in \{(k_i+1/2)t_{clk}: 0 \leq k_i < t_{int}/t_{clk}\}$, as shown in FIG. 4.

Figure 4:
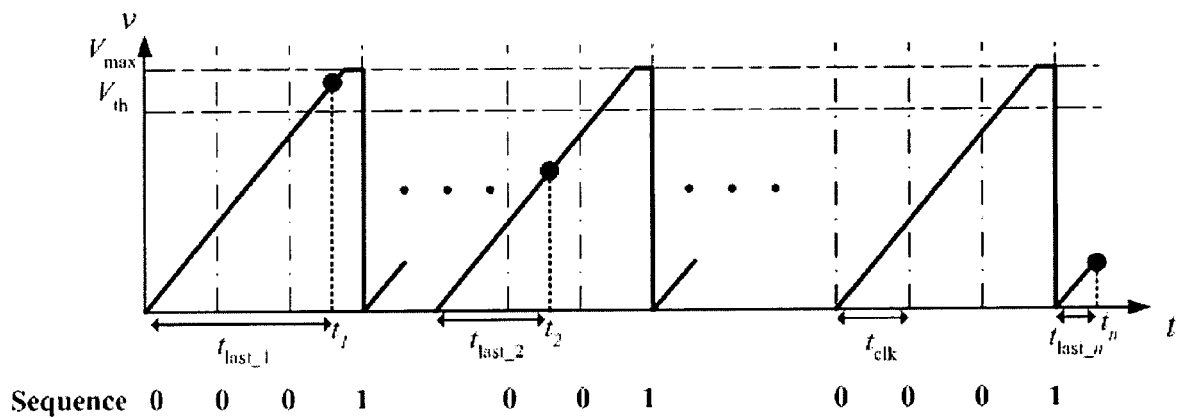
FIG. 4 shows exemplary modulator output as well as corresponding binary sequence.
Figure 5:
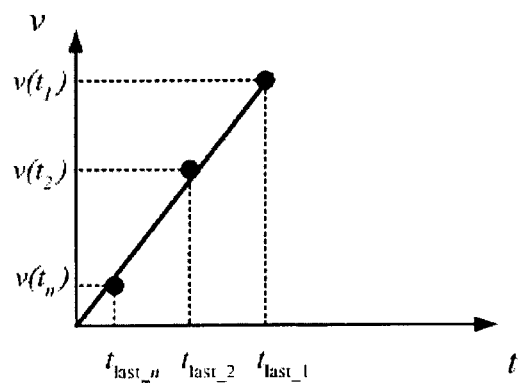
FIG. 5 illustrates photocurrent estimation with multiple captures.

We define the effective integration time $t_{last\_i}$, $1 \leq i \leq n$, to be the time from the last reset before $t_i$ to $t_i$, as shown in FIG. 4. Clearly, the effective capture integration times $t_{last\_1}$, $t_{last\_2}, \ldots, t_{last\_n}$, can be readily calculated from the reset sequence. The photocurrent is estimated with the capture values and their effective integration times $(v(t_i), t_{last\_i})$, $1 \leq i \leq n$, as shown in FIG. 5. This estimation can be performed using only the non-saturated capture with the longest integration time, e.g., by an appropriate least-squares fit of the captures. The FMC architecture is not limited to any particular photocurrent estimation techniques. As one skilled in the art will appreciate, other ways of estimating the input may also be implemented with the FMC scheme disclosed herein.

Since the FMC architecture exploits the accuracy of clock references, it can be implemented with relaxed circuit requirements. The AFE part of the FMC architecture corresponds to the modulator block 310 in FIG. 3 and is implemented per-pixel. In some embodiments, it performs direct integration and comprises a simple latch (comparator) and a sample-and-hold. Alternatively, it comprises a capacitive transimpedance amplifier (CTIA), a comparator with relaxed specifications, and a sample-and-hold. The $V_{th}$ and clock signals as well as a control signal for the sample-and-hold are routed to all pixels. For planar visible range imager sensors, the integrator can simply refer to a direct integration on the photodiode.

The accuracy of $V_{th}$ and the CTIA bias are also relaxed, while the accuracy of the clock jitter is critical (e.g., better than 1 ns), which is not difficult to achieve in sub-micron technologies. The ADC, which is shared by a block of several neighboring pixels, is optimized for low power and only needs to run at modest speed. Candidate ADC architectures include multi-channel pipeline and successive approximation. The filter 330 is implemented as part of a DSPC, which is shared by a block of pixels. The DSPC estimates the reset periods and effective integration times for each pixel in its block. It then sorts the capture values and detects anomalies due to saturation, motion, or disturbance and estimates the photocurrent. These functions can be implemented with a few counters, memory for storing the times and capture values, an ALU, and glue logic. The DSPC also provides the control signals for the AFE and ADC in order to adapt the system operation to the imaging conditions.

In a vertically integrated implementation, e.g., VISA, the detector would occupy the top layer, with a read-out integrated circuit (ROIC) comprising the AFE, the ADC, and the DSPC/DSP coupled thereto from below. The AFE would occupy one or more layers optimized for analog performance, the ADC would occupy one or more layers optimized for mixed signal, and the DSPC would occupy one or more layers optimized for logic performance and memory density.

As one skilled in the art will recognize, the FMC architecture is not limited to multi-layer sensor arrays such as focal plane arrays. It can be readily implemented in a variety of image sensors and adapted to various specifications and/or applications. In some embodiments, the FMC scheme may be embodied in a regular/standard planar CMOS image sensor with direct integration, if less fidelity (SNR) is required. Alternatively, it can be embodied in a linear sensor array.

2. Analysis of Dynamic Range (DR) and SNR for the FMC Architecture

To quantify DR, note that $$i_{max} = \frac{qQ_{max}}{t_{clk}/2}$$

and $$i_{min} = \frac{q\sigma_{Readout-eff}}{t_{int}},$$

where $\sigma_{Readout-eff}$ is the standard deviation of the effective readout noise. Thus, $$DR = \frac{2Q_{max}t_{int}}{\sigma_{Readout-eff}t_{clk}}.$$

To quantify SNR, we need to consider the capture scheme, the number of captures, and the type of filter used. We first quantify SNR for a single capture at time $0<t\leq t_{int}$ that is independent of pixel signal.

For a given $i_{ph}$, the time to saturation $t_{sat}$, reset period $t_{reset}$, and time after the last reset $t_{last}$ are given by $$t_{sat} = \frac{qQ_{max}}{i_{ph}}, \; t_{reset} = \left\lceil \frac{qQ_{tb}}{i_{ph}t_{clk}} \right\rceil t_{clk}, \text{ and } t_{last} = t - \left\lfloor \frac{t}{t_{reset}} \right\rfloor \times t_{reset}.$$

Now, define $$\phi(i_{ph}, t) = \begin{cases} t_{last}/t_{sat}(i_{ph}), & \text{if } t_{last}/t_{sat}(i_{ph}) \leq 1 \\ 0, & \text{if } t_{last}/t_{sat}(i_{ph}) > 1 \end{cases}.$$

Note that SNR monotonically increases with $\phi$ and is equal to $Q_{max}$ when $\phi=1$. Assuming shot noise dominates, i.e., $\phi > \sigma_{Readout}^2/Q_{max}$, SNR for a single capture at time $t$ is given by $$SNR(i_{ph}, t) \approx \phi(i_{ph}, t)Q_{max}.$$

Figure 6:
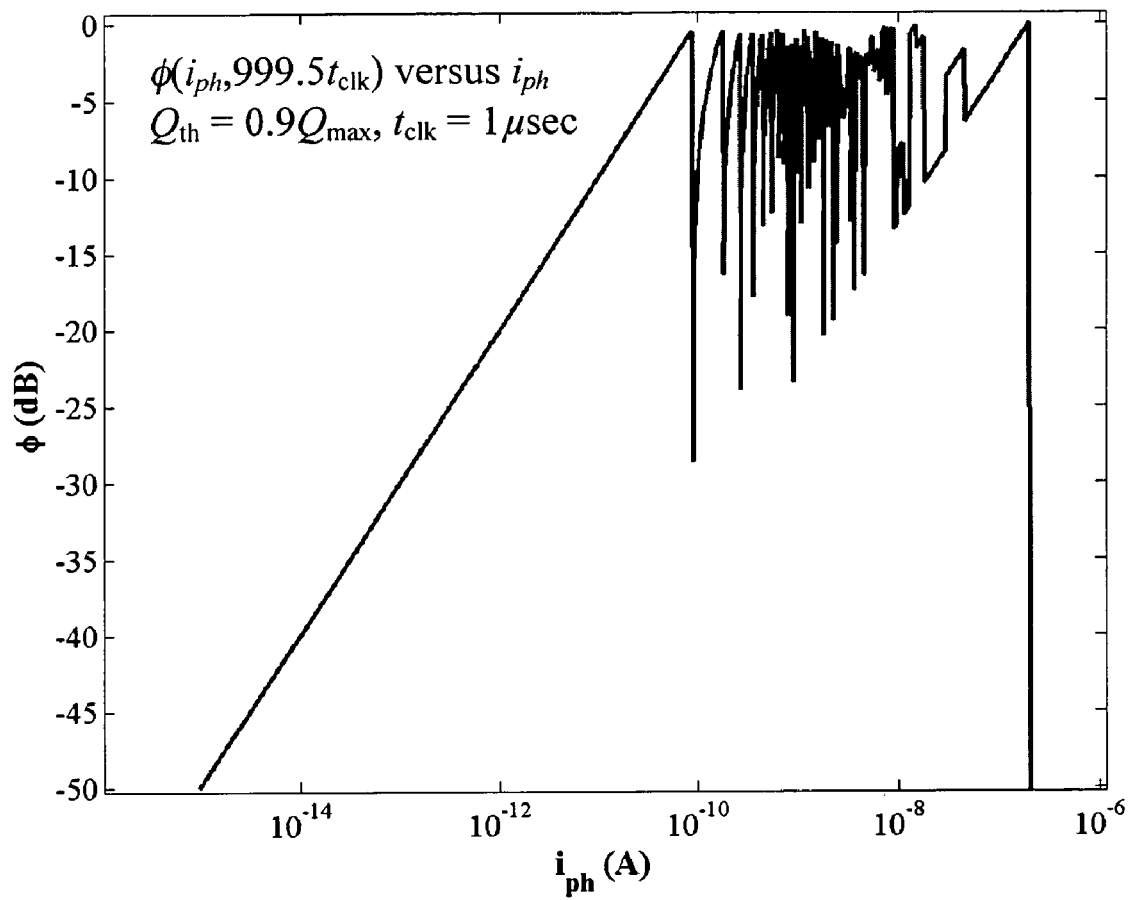
FIG. 6 plots φ dipping as photocurrent ($i_{ph}$) varies.

$\phi$ is plotted in FIG. 6. Note the large dips in $\phi$ as $i_{ph}$ varies (i.e., $\phi$ corresponds to signal level). Note also that these dips are the largest when reset occurs right before the capture time $t$ or when the integrator is saturated at $t$.

There are two main approaches to eliminating these large dips and providing a guarantee on the minimum SNR in the extended range. The first approach is to adapt $t$ to the photocurrent in each pixel. This approach guarantees close to peak SNR in the extended range, but at the expense of additional per-pixel circuits to select the best capture time after the first reset occurs. The second approach is to capture several samples at globally set times. This approach eliminates the need for extra per-pixel circuits, but at the expense of performing more A/D conversions.

In our approach, the integration time for each sample is derived from the binary reset sequence. Below example shows that, by judiciously selecting the capture times, one can guarantee good SNR across the extended range with no more than 4 captures.

Assuming n captures at times $0 \leq t_1 \leq t_2 \ldots \leq t_n$, where $t_i \in \{(k_i+1/2)t_{clk}, \text{ for } 0 \leq k_i < t_{int}/t_{clk}\}$, define $\phi(t_i)$, for $1 \leq i \leq n$, as before. To guarantee a prescribed minimum SNR in the extended range, we look for the smallest number of captures and each capture's time. Mathematically, find the smallest n and capture times $t_1, t_2, \ldots, t_n$ such that $$\max_i(\phi(t_i)) > \alpha \; \forall \; i_{ph} > Q_{\max}/t_{int} \text{ and } 0 < \alpha < 1.$$

Figure 7:
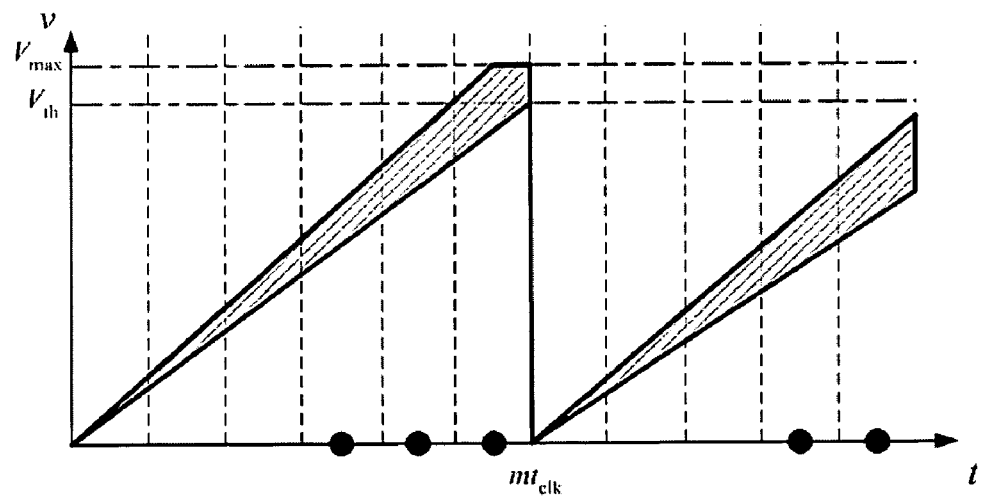
FIG. 7 illustrates range of photocurrent values.

This problem can be reformulated as follows. For a given $m = t_{reset}/t_{clk} \geq 2$, the range of $i_{ph}$ is between $qQ_{th}/mt_{clk}$ and $qQ_{th}/(m-1)t_{clk}$. FIG. 7 shows the range of $i_{ph}$ values that generate the same m. Thus, for a given $\alpha$, assuming $Q_{th} = 0.9 Q_{max}$, the set of capture time indices such that $\phi \geq \alpha$ are given by $$K_m = \begin{cases} \left\{ j : \alpha \leq \dfrac{j+0.5}{m} - \left\lfloor \dfrac{j+0.5}{m} \right\rfloor \leq \dfrac{m-1}{m} \right\}, & \text{for } 2 \leq m \leq 5 \\ \left\{ j : \alpha \leq \dfrac{j+0.5}{m} - \left\lfloor \dfrac{j+0.5}{m} \right\rfloor \leq 1 \right\}, & \text{for } 5 < m \leq n_{\max} \end{cases},$$

where $m_{max} = t_{int}/t_{clk}$.

Now, consider the $(n_{max}-1) \times n_{max}$ matrix $A(n_{max}-1) \times n_{max}$ with entries $$\alpha_{mk} = \begin{cases} 1 & \text{if } k \in K_m \\ 0 & \text{otherwise} \end{cases}$$

in which the ones in the kth column correspond to the ranges of photocurrents for which $\phi \geq \alpha$. Thus, the problem of determining the minimum number of captures and each capture's time reduces to selecting the minimum number of columns of the matrix A such that their logical OR is the all ones column vector. The indices of the capture times correspond to the indices of the selected columns. The problem as formulated is NP-complete.

Below we describe a method based on a heuristic algorithm for finding a solution to the problem. The programming techniques necessary to implement such a method are known to those skilled in the art. It starts by choosing the column with the maximum number of ones. If there is more than one column with the same maximum number of ones, one of them is selected at random. Next, it forms a new matrix by deleting the selected column and the rows corresponding to the ones in the column. This procedure is repeated until all rows of the matrix are deleted. The indices of the selected columns in the original matrix determine the capture times.

We applied this procedure to different values of $\alpha$ and $n_{max} = 1000$ and found several 3 capture solutions with $\alpha = 0.33$ and several 4 capture solutions with $\alpha = 0.5$. Table 1 shows some of the capture time indices for $\alpha = 0.33$ and $\alpha = 0.5$ for $n_{max} = 1000$.

TABLE 1

| | | | |
|---|---|---|---|
| $\alpha = 0.33$ | (101, 157, 370) | (143, 334, 818) | (250, 333, 383) |
| $\alpha = 0.5$ | (143, 157, 335, 502) | (148, 335, 502, 969) | (143, 337, 502, 850) |

Figure 8:
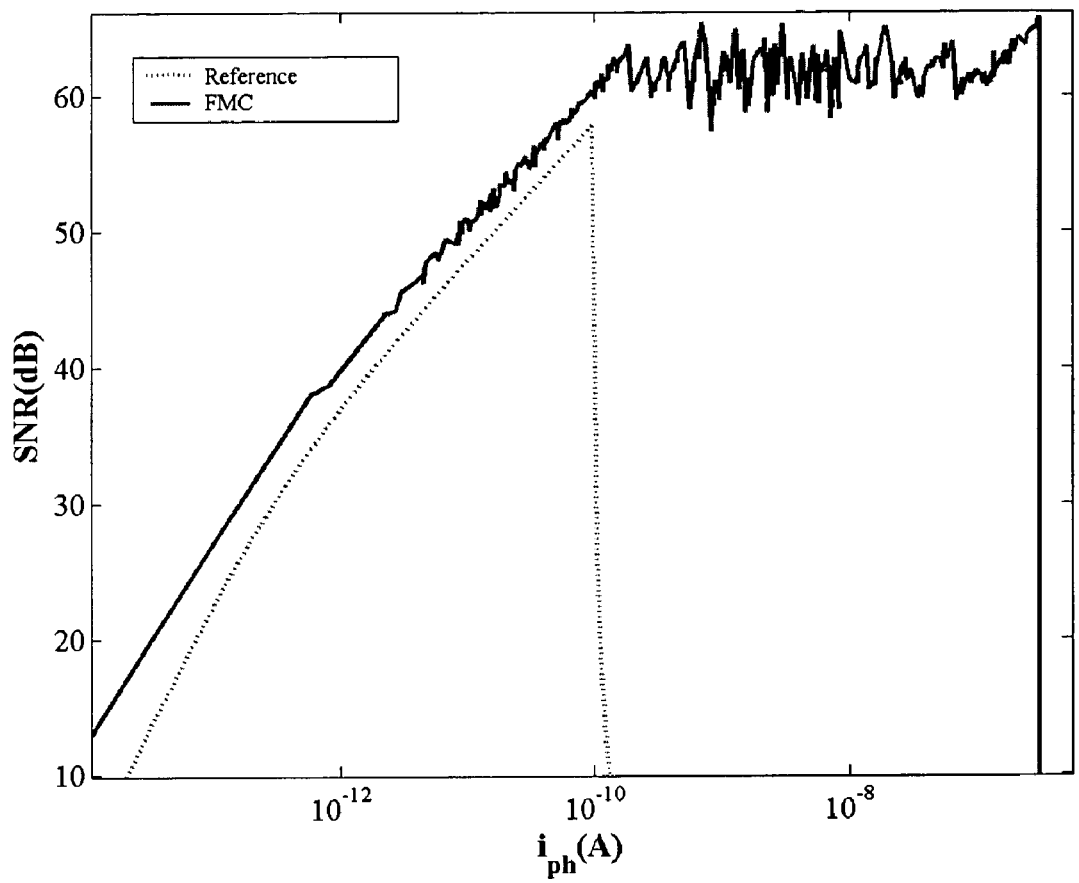
FIG. 8 plots the performance of an image sensor implementing the adaptive pixel architecture of the present invention versus that of a reference conventional sensor.

FIG. 8 shows SNR versus $i_{ph}$ for folded-multiple-capture with optimal four global capture times, assuming $Q_{max} = 625,000e-$, $Q_{th}/Q_{max} = 0.9$, $t_{int} = 1$ msec, $t_{clk} = 1$ µsec, reset duration of 0.1 µsec, $\sigma_{Switch} = \sigma_{Reset} = 120e-$, $\sigma_{Readout} = 40e-$, $\sigma_{Comparator} = 1000e-$, $\sigma_{Offset} = 18000e-$ and achieves DR=174 dB. The FMC performance is compared with a reference sensor with the same well capacity, which is optimized for low read noise. To eliminate reset offset, a readout at t=0 is assumed for both plots. A least-squares fit is used to estimate the photocurrent for both. The results are obtained using Monte Carlo simulations and take into consideration finite reset duration, comparator and reset noise and offset, sample-and-hold switched capacitor noise, and ADC quantization. As illustrated in FIG. 8, in spite of the large comparator noise $\sigma_{Comparator}$ and $\sigma_{Offset}$, close to optimal SNR is achieved in the extended range. Further, SNR is higher than that of the reference sensor due to the multiple captures and the least-squares fit. As one skilled in the art will appreciate, an important aspect of this invention is realizing that self-reset can be used for folding the signal. Based on this principle, it is possible to find capture times that give high fidelity even with synchronous self-reset. Similarly, we can find global capture times to minimize the average distortion over the entire image.

3. Disturbance Tolerance

In a number of applications, disturbances instantaneously appear in the camera field of view, for example, due to pulsed or fast moving laser jammer or sun reflection. Each of such a disturbance causes large spikes in pixel photocurrent, undesirably resulting in complete or partial loss of information. Idealizing such a spike by a delta function current at $t_s$, the total pixel photocurrent during a frame can be represented by $$i_{ph}(t) = i_{ph} + d\delta(t-t_s), \; 0 \leq t_s \leq t_{int},$$

where $i_{ph}$ is the scene induced photocurrent. The integrator value is given by $$v(t) = \begin{cases} \dfrac{1}{C}(i_{ph}t + d), & \text{if } v(t) < V_{\max} \\ V_{\max} & \text{otherwise} \end{cases},$$

where C is the integrator capacitance.

In a conventional architecture, spikes may be detected by operating the focal-plane array at a very high frame rate, detecting each spike and eliminating it before performing frame addition and accumulation. This solution comes at the expense of high power dissipation and degradation in SNR, since the CTIA and the high resolution ADCs must run at very high speeds.

Figure 9:
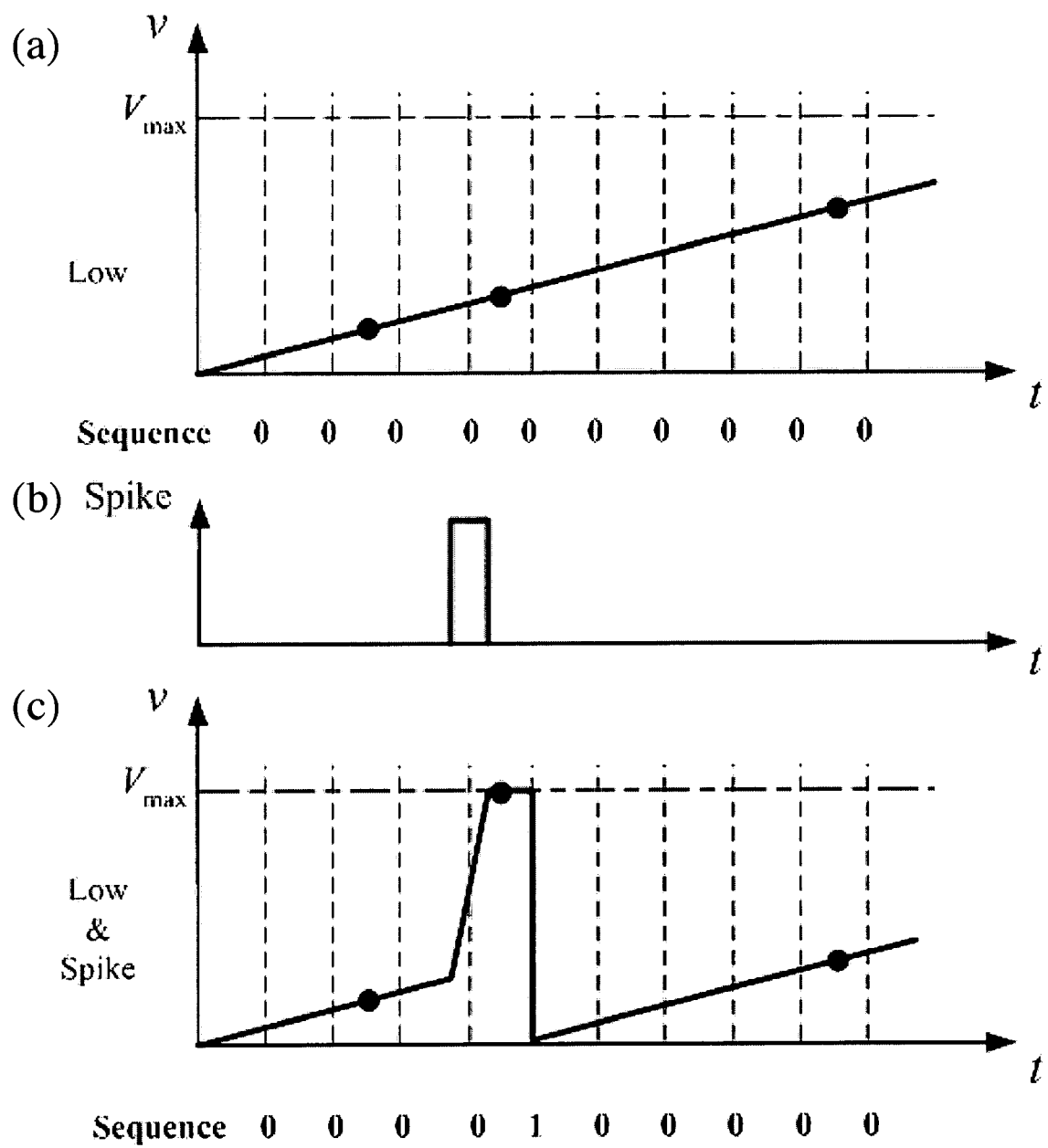
FIG. 9 shows modulator output with and without disturbance.

With the FMC architecture disclosed herein, spikes can be detected and corrected at pixel-level (subframe scale) without the need to operate the sensor array at high frame rates. FIG. 9 exemplifies how this detection can be performed. FIG. 9(a) shows the output of the integrator for a low photocurrent, which would incur the most severe distortion due to a spike. Since the photocurrent is low, the reset sequence without a spike has no ones. In the presence of a spike, as shown in FIG. 9(b), the integrator saturates causing the reset sequence to contain a 1, as shown in FIG. 9(c). This anomaly in the reset sequence is easily detected and used to determine whether or not a capture is used in the photocurrent estimation. If a capture occurs during the time between the disturbance and the reset, it is discarded. Otherwise, all captures are used.

In general, the reset sequence for a constant photocurrent is mostly periodic, with a small variation in the period due to noise. To detect a spike, the capture values and their effective integration times are inspected after discarding saturated captures. If a capture value is outside the expected range as predicted by all capture values and their effective integration times, it is also discarded. The same procedure can also be used to detect and correct for image blur. See, X. Liu and A. El Gamal, "Synthesis of High Dynamic Range Motion Blur Free Image from Multiple Captures," IEEE Transactions on Circuits and Systems I: Fundamental Theory and Applications, April 2003, 50(4), pp. 530-539, the content of which is incorporated herein by reference.

Figure 10:
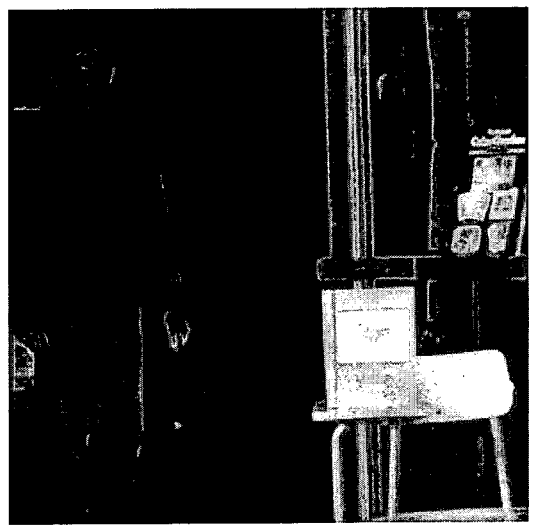
FIG. 10 (a) is an image with a high dynamic range scene; (b) simulates the scene of (a) with disturbance due to a laser shone across it, as captured by a conventional focal plane array; and (c) simulates the scene of (a) with disturbance due to a laser shone across it, as captured by an adaptive pixel sensor embodying the present invention.
Figure 10:
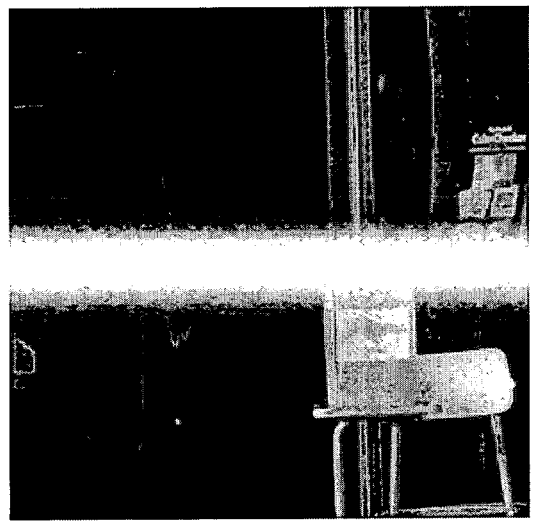
Figure 10:
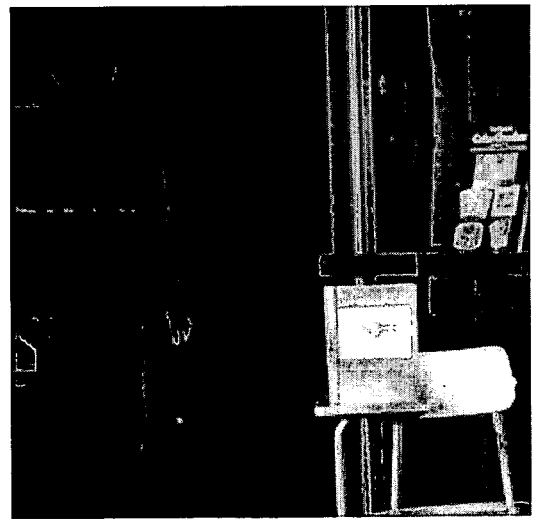

FIG. 10 demonstrates the disturbance tolerance feature of the FMC architecture. FIG. 10(a) is an image with a high dynamic range (HDR) scene. FIG. 10(b) simulates the HDR scene with disturbance due to a laser shone across it, as would be captured by a conventional focal plane array. FIG. 10(c) simulates the output of the FMC scheme with disturbance detection and correction. Notice that with the exception of minor artifacts around the person and the monitor, the presence of the disturbance is completely eliminated.

This detection scheme assumes that there are enough captures to detect an anomaly in the modulator output. Further, if multiple spikes occur, successful detection may be possible depending on the placement of the spikes and the number and placement of the captures.

4. FMC Versus Extended Counting (EC)

Figure 11:
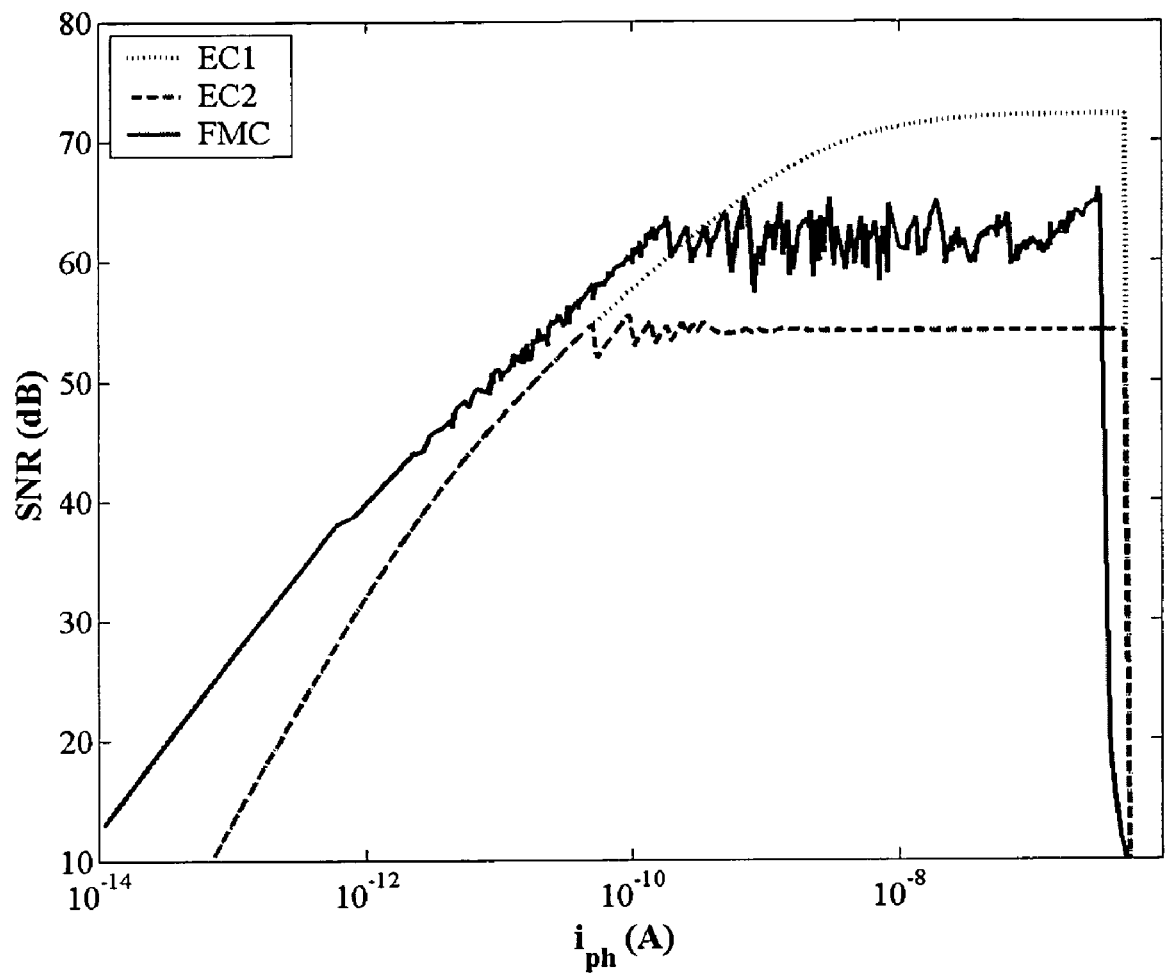
FIG. 11 compares the performance of the present invention with a reference technique.

FIG. 11 plots the SNR versus $i_{ph}$ for the FMC and the extended counting architectures for two values of the standard deviation of subtraction offset, assuming $Q_{max}$=625,000e−, $t_{int}$=1 msec, $\sigma_{Readout}$=40e−, $\sigma_{Comparator}$, $\sigma_{Switch}$=127e−. FMC (four captures) assumes $Q_{th}/Q_{max}$=0.9, $\sigma_{Offset}$=18000e−, $t_{clk}$=1 μsec. EC 1 assumes $t_{clk}$=0.1 μsec, $\sigma_{Offset}$=76e−, $\sigma_{Switch}$=127e−. EC 2 assumes $t_{clk}$=0.1 μsec, $\sigma_{Offset}$=610e−, $\sigma_{Switch}$=127e−.

As shown in FIG. 11, compared to both extended counting plots EC1 and EC2, the FMC scheme outperforms the EC scheme at the low end, i.e., it achieves better SNR, due to multiple capture with estimation. At the high end, i.e., the extended range, the FMC has similar good performance with substantially reduced power consumption, due to a significantly lower clock rate. By comparing the DR formulas for the EC and FMC (see Section 2 above) architectures, it is apparent that the FMC scheme achieves the same dynamic range and frame rate as the EC scheme, at a fraction (¼th) of the clock speed thereof. Note the SNR of the extended counting scheme depends heavily on the process parameter variations and can be higher, e.g., EC1, than the FMC scheme under optimistic assumptions.

Below compares the power consumption between the FMC and EC architectures through an example. In the EC architecture, EC is a 20-bit uniform quantizer and power consumption is therefore dominated by the CTIA component. Assuming an ADC figure-of-merit (FOM) of 0.5 pJ/conversion, to achieve 120 dB of DR at 1000 frames/sec for a 256×256 array, power consumption would be 0.5 pJ×$2^{20}$×1000×256×256=34 Watt.

By comparison, the FMC scheme adapts the integration time to signal level while maintaining high fidelity. Using the same FOM for the fine ADC stage and assuming four captures, the power consumption of the ADC stage is 0.5 pJ×$2^{13}$×1000×4×256×256=1 Watt. That is, for the same 120 dB DR at the speed of 1000 frames/sec, the FMC architecture dissipates less than 2 Watt, which is significantly less than the 34 Watt power consumption in the EC scheme.

Since settling time error is cancelled in the self-reset operation instead of in charge subtraction, the CTIA gain-bandwidth requirement of the AFE amplifier is also more relaxed in the FMC architecture. Assuming the same clock speed, the CTIA in the extended counting scheme requires twice the bandwidth of the CTIA in the self-reset scheme, the gain-bandwidth of the self-reset CTIA is thus 2×4=8 times lower. As a result, assuming MOS square-law, the power consumption of the CTIA in the FMC architecture is lower than that in the extended counting scheme by a factor of 64.

With relaxed per-pixel hardware requirements, the FMC architecture is robust to device mismatches and noise. Since only the slope of the integrator ramp is estimated in the FMC architecture, reset and comparator offsets are cancelled via background calibration. By comparison, no background calibration is possible in the extended counting scheme. The charge subtraction offset, which is caused by switch pedestal error, capacitor mismatch, bounces in reference voltage, and settling error, is accumulated during the integration time and therefore cannot be cancelled. Although some of these offset components can be cancelled by foreground calibration, the component due to settling error cannot be cancelled because it is time varying and signal dependent.

This leads to another important robustness feature of the FMC scheme. That is, the settling error component of reset offset is equal for all resets. This makes it possible to reduce reset duration without increasing the amplifier bias current. At low photocurrents, the dominant noise components are reset, switched capacitor and read noise. In the FMC architecture, reset noise is cancelled as part of the background calibration. The other components as well as the 1/f noise are reduced by the least-squares fit.

Another advantage of the FMC scheme is that it detects and corrects disturbances at the subframe scale. The extended counting scheme cannot detect such disturbances without increasing frame rate, and consequently power consumption.

The FMC architecture described above advantageously adapts frame rate (sampling rate) to the intensity of electrical signals that correspond to imaging conditions, e.g., illumination levels, motion, and disturbances. As such, the FMC architecture enables reduced data transfer rates, storage, and power consumption for the entire imaging system by orders of magnitude relative to a conventional imager operating at the highest required frame rate independent of the imaging conditions. With minimal per-pixel hardware requirements (e.g., the comparator of the AFE can be a simple latch), low SNR, high dynamic range, disturbance tolerance, and ultra-low power consumption, the adaptive pixel architecture of the present invention is ideal for many imaging applications. Moreover, since it achieves VISA requirements, i.e., providing a high dynamic range of about 120 dB or more at a high speed of about 1000 or more frames/sec, it is well suited for vertical integration.

Although the present invention and its advantages have been described in detail, it should be understood that the FMC is adaptive to different imaging requirements and therefore should not be construed as being limited to or defined by what is shown or discussed herein. The drawings, tables, and description disclosed herein illustrate technologies related to the invention, show examples of the invention, and provide examples of using the invention. Known methods, procedures, systems, elements, or components may be discussed without giving details, so to avoid obscuring the principles of the invention. As one of ordinary skill in the art will appreciate, various changes, substitutions, and alterations could be made or otherwise implemented without departing from the principles of the present invention. For example, the number of samples (multiple captures) and how to estimate (estimation technique) can vary depending on the specification required and/or application desired.

Accordingly, the scope of the present invention should be determined by the following claims and their legal equivalents.

We claim:

1. An image sensor embodying a folded multiple capture architecture comprising:
    a multi-bit analog-digital convertor (ADC) stage shared by a plurality of pixels;
    a digital-signal-processor/controller (DSPC) stage coupled to said ADC stage; and
    a per-pixel analog-front-end (AFE) coupled to said ADC and said DSPC; wherein said AFE having
        an integrator that integrates photocurrent $i_{ph}$ received from a photodetector and outputs a corresponding digital value v(t) to said ADC; and
        a comparator coupled to said integrator for periodically comparing said digital value v(t) with a threshold value $V_{th}$ synchronous with a clock signal; wherein
        said comparator produces a 1 and resets said integrator every time said digital value v(t) is above said threshold value $V_{th}$; and wherein
        said comparator produces a 0 every time said digital value v(t) is not above said threshold value $V_{th}$, thereby generating a binary reset sequence;
    wherein
        said ADC globally captures said digital value v(t) multiple times; and wherein
        based on outputs received from said AFE and said ADC, said DSPC estimates reset periods and effective integration times for each pixel coupled thereto, sorts captured values, detects anomalies, and estimates photocurrent.

2. The image sensor of claim 1, wherein said DSPC estimates said photocurrent with only non-saturated captures.

3. The image sensor of claim 2, wherein said DSPC utilizes a least-squares fit to estimate said photocurrent.

4. The image sensor of claim 1, wherein said ADC captures said digital value v(t) four times or less.

5. The image sensor of claim 4, wherein said ADC stage is optimized to consume about or less than 1 Watt of power.

6. The image sensor of claim 1, wherein said ADC is optimized for ultra-low power consumption.

7. The image sensor of claim 1, wherein said anomalies are caused by saturation, motion, disturbance, or a combination thereof.

8. The image sensor of claim 1, wherein said DSPC controls said AFE and said ADC so to adapt operation of said image sensor to one or more imaging conditions.

9. The image sensor of claim 1, wherein said threshold value $V_{th}$ and said clock signal are routed to all pixels of said image sensor.

10. The image sensor of claim 1, further comprises a memory buffer for storing said binary reset sequence and readout values.

11. A planar CMOS image sensor embodying the folded multiple capture architecture according to claim 1.

12. A linear array embodying the folded multiple capture architecture according to claim 1.

13. A focal plane array embodying the folded multiple capture architecture according to claim 1.

14. A vertically integrated sensor array (VISA) embodying the folded multiple capture architecture according to claim 1, said VISA comprising:
    a photodetector layer;
    said AFE, in which said AFE is coupled to said photodetector layer in one or more layers optimized for analog performance;
    said ADC, in one or more layers optimized for mixed signal; and
    said DSPC, in one or more layers optimized for logic performance and memory density.

* * * * *